(12) United States Patent
Gacanin et al.

(10) Patent No.: US 9,967,142 B2
(45) Date of Patent: May 8, 2018

(54) METHOD AND SYSTEM FOR TROUBLESHOOTING IN IN-HOUSE NETWORKS

(75) Inventors: Haris Gacanin, Antwerp (BE); Veselin Pizurica, Ghent (BE)

(73) Assignee: Alcatel Lucent, Boulogne-Billancourt (FR)

( * ) Notice: Subject to any disclaimer, the term of this patent is extended or adjusted under 35 U.S.C. 154(b) by 122 days.

(21) Appl. No.: 14/236,976

(22) PCT Filed: Aug. 21, 2012

(86) PCT No.: PCT/EP2012/066261
§ 371 (c)(1),
(2), (4) Date: Feb. 17, 2014

(87) PCT Pub. No.: WO2013/030045
PCT Pub. Date: Mar. 7, 2013

(65) Prior Publication Data
US 2015/0039733 A1    Feb. 5, 2015

(30) Foreign Application Priority Data
Aug. 30, 2011  (EP) ..................................... 11290385

(51) Int. Cl.
*G06F 15/177* (2006.01)
*H04L 12/24* (2006.01)
(Continued)

(52) U.S. Cl.
CPC ...... *H04L 41/0816* (2013.01); *G06F 11/0793* (2013.01); *H04L 41/022* (2013.01);
(Continued)

(58) Field of Classification Search
None
See application file for complete search history.

(56) References Cited

U.S. PATENT DOCUMENTS 6,084,956 A * 7/2000 Turner .................... H04L 12/64
                                                                       370/352
6,697,864 B1 * 2/2004 Demirtjis ............ H04L 63/0272
                                                                       709/217
(Continued)

FOREIGN PATENT DOCUMENTS

CN        1510947 A    7/2004
CN        1968486 A    5/2007
(Continued)

OTHER PUBLICATIONS

Chinese Office Action dated Mar. 21, 2016, issued in Chinese Patent Application No. 201280041969.2.

*Primary Examiner* — Dhairya A Patel
(74) *Attorney, Agent, or Firm* — Harness, Dickey & Pierce, P.L.C.

(57) ABSTRACT

A system for solving a technical problem in a network architecture with at least one service operator network and a plurality of in-house networks supported by the at least one service operator network, includes a computing device adapted to receive in-house network parameters and to determine, based on the received in-house network parameters, a coordination strategy involving the reconfiguration of a number of involved in-house networks being supported by a number of involved service operator servers. The computing device is adapted to inform the number of involved operator servers of the coordination strategy. A service operator server is adapted to reconfigure an in-house network according to the coordination strategy to solve the technical problem.

15 Claims, 8 Drawing Sheets

(51) Int. Cl.
*G06F 11/07* (2006.01)
*H04W 24/08* (2009.01)

(52) U.S. Cl.
CPC ........ H04L 41/044 (2013.01); H04L 41/0813 (2013.01); *H04W 24/08* (2013.01)

(56) References Cited

U.S. PATENT DOCUMENTS

| | | | | |
|---|---|---|---|---|
| 9,197,559 | B1* | 11/2015 | Cloonan | H04L 41/12 |
| 2003/0056226 | A1* | 3/2003 | Lazarus | H04N 7/17309 |
| | | | | 725/129 |
| 2003/0161313 | A1* | 8/2003 | Jinmei | H04L 12/2856 |
| | | | | 370/392 |
| 2004/0127191 | A1 | 7/2004 | Matsunaga | |
| 2006/0018283 | A1* | 1/2006 | Lewis | G06Q 20/102 |
| | | | | 370/331 |
| 2006/0128443 | A1* | 6/2006 | Takayama | H04M 1/6058 |
| | | | | 455/569.1 |
| 2008/0225687 | A1* | 9/2008 | Oksman | H04L 41/0893 |
| | | | | 370/201 |
| 2009/0128443 | A1* | 5/2009 | Horng | F28F 3/02 |
| | | | | 343/878 |
| 2010/0027439 | A1* | 2/2010 | Shand | H04W 24/08 |
| | | | | 370/252 |
| 2011/0014941 | A1 | 1/2011 | Matsunaga | |
| 2011/0021238 | A1* | 1/2011 | Matsunaga | H04W 16/14 |
| | | | | 455/522 |
| 2011/0228665 | A1* | 9/2011 | Kumar | G06Q 10/06 |
| | | | | 370/216 |
| 2011/0258453 | A1* | 10/2011 | Mansfield | H04L 63/0823 |
| | | | | 713/173 |

FOREIGN PATENT DOCUMENTS

| | | |
|---|---|---|
| CN | 101964985 A | 2/2011 |
| CN | 102111779 A | 6/2011 |
| EP | 1434456 A2 | 6/2004 |

\* cited by examiner

METHOD AND SYSTEM FOR TROUBLESHOOTING IN IN-HOUSE NETWORKS

CROSS-REFERENCE TO RELATED APPLICATIONS

This application is a national phase under 35 U.S.C. §371 of PCT International Application No. PCT/EP2012/066261 which has an International filing date of Aug. 21, 2012, which claims priority to European patent application number EP 11290385.1 filed Aug. 30, 2011; the entire contents of each of which are hereby incorporated by reference.

TECHNICAL FIELD

The field of the invention relates to troubleshooting in in-house networks. The present invention relates in particular to a system and method for solving a technical problem in a network architecture with at least one service operator network and a plurality of in-house networks supported by said at least one service operator network.

BACKGROUND

International Telecommunication Union (ITU) G.hn standard was defined to enable the broadband data communication required by in-house both broadband and narrowband applications. In G.hn, different domains are available for the in-house network access over different mediums such as wireless, twisted-pairs, coax, and power line cables. The available network resources are limited by the network connectivity and a large number of home network devices. Since the home network broadband applications are becoming very popular and can be provided by more than one network operator, an improved management and troubleshooting of home networks is needed.

SUMMARY

The object of embodiments of the present invention is to provide a system and a method for improved troubleshooting in in-house networks, also called home networks.

To that end an embodiment of the system of the invention is distinguished in that the system comprises at least one service operator server supporting a plurality of in-house networks and a computing means. Each service operator server of said at least one service operator servers is adapted to obtain in-house network parameters from said plurality of in-house networks and to send said in-house network parameters to said computing means. The computing means are adapted to receive said in-house network parameters, to determine, based on the received in-house network parameters a coordination strategy involving, the reconfiguration of a number of involved in-house networks of said plurality of in-house networks, said number of involved in-house networks being supported by a number of involved service networks of said plurality of service operator networks, and to inform said number of involved service operator networks of said coordination strategy. Each service operator server is further adapted to reconfigure a supported in-house network according to the coordination strategy to solve the technical problem.

Thus, according to an embodiment of the invention there is provided an over-the-top dynamic management and coordination mechanism for multiple in-house networks supported by a single service/network operator or by multiple service/network operators. This will enable a centralized mechanism over different service/network providers for efficient coordination of different in-house networks. In particular, this invention is valuable for G.hn home network deployments.

An in-house network, also called home network or home area network (HAN) is a residential local area network (LAN). It is used for communication between digital devices typically deployed in the home, usually a small number of personal computers and accessories, such as printers, mobile computing devices, music devices, components of a domotica system, etc.

According to a preferred embodiment the in-house network parameters comprise any one or more of the following parameters: signal power in the in-house network, used channels in the in-house network, available channels in the in-house network, a network security identifier (network SID) of the in-house network, an ID of a device in the in-house network, a gain of a channel in the in-house network, a MAC address used in the in-house network, a user ID used in the in-house network, an IP address used in the in-house network.

According to an embodiment each service operator further comprises processing means to perform processing on the obtained in-house network parameters and to send the in-house network parameters, optionally in a processed form, to the computing means. In that way the parameters can be provided in an improved way to the computing means. Further the processing means may be adapted to determine whether the technical problem can be solved without the need for additional information from other service operator networks, and if it is determined that the technical problem cannot be solved, to send the in-house network parameters, optionally in processed form, to the computing means.

According to an embodiment of the invention the at least one service operator network comprises at least a first and a second service operator network. The invention is particularly advantageous for solving problems related to the interference between a first in-house network supported by a first service operator and a second in-house network supported by a second service operator. Through the use of a single computing means which is addressable by different service operators and which collects in-house network parameters from the in-house networks of those different service providers, such problems can be easily dealt with.

According to an embodiment of the invention the computing means comprise an operation support systems (OSS) application programming interface (API).

According to a further embodiment the computing means may be further adapted to request a service operator of the at least one service providers to send in-house network parameters related to one or more of its in-house networks. In that way, e.g. when the computing means have difficulty in solving a problem they may request additional parameters from other service operators which could help in solving the problem.

According to another embodiment of the invention there is provided a method for solving a technical problem in a network architecture with at least one service operator network and a plurality of in-house networks supported by said at least one service operator network. In said one or more service operator networks in-house network parameters are obtained from said plurality of in-house networks. The in-house network parameters are sent to a computing means. In reply, one or more of the service operator networks are informed of a coordination strategy involving the reconfiguration of a number of involved in-house networks of said plurality of in-house networks based on the sent in-house network parameters. Next, the one or more involved in-house networks are reconfigured to solve the technical problem.

According to a further embodiment the method further comprises processing the obtained in-house network parameters in the service operator network. The in-house network parameters may optionally be sent in a processed form to the computing means. The processing may further comprise determining whether the technical problem can be solved within the service operator network, and if it is determined that the technical problem cannot be solved within the service operator network, proceed with the sending of the in-house network parameters, optionally in processed form, to the computing means.

According to a preferred embodiment the at least one service operator network comprises at least a first and a second service operator network associated with a plurality of first and second in-house networks respectively. The obtaining in-house network parameters and the sending thereof to the computing means is then done by first and second service operator servers associated with the first and the second service operator network. Further, at least the first and/or the second service operator server is informed by said computing means of a coordination strategy involving a number of said plurality of first in-house networks and/or a number of said plurality of second in-house networks. The reconfiguring then comprises the first service operator server reconfiguring one or more of said plurality of first in-house networks and/or the second service operator server reconfiguring one or more of said plurality of second in-house networks.

Further, an embodiment of the invention relates to a method comprising at a computing means the following steps. The computing means receive from said at least one service operator network in-house network parameters obtained from said plurality of in-house networks. The computing means determine based on the received network parameters a coordination strategy involving the reconfiguration of a one or more involved in-house networks of said plurality of in-house networks, one or more involved service operator networks of said at least one service operator network supporting said one or more involved in-house networks. Thereupon the computing means inform said one or more involved service operator networks of said coordination strategy, such that the technical problem can be solved.

According to a further embodiment the computing means request a service operator network of the at least one service providers to send in-house network parameters related to one or more of its in-house networks.

Finally, an embodiment of the invention relates to a computer program product storing programming code for performing any of the embodiments of the method disclosed above.

BRIEF DESCRIPTION OF THE FIGURES

The accompanying drawings are used to illustrate presently preferred non-limiting exemplary embodiments of methods and devices of the present invention. The above and other advantages of features and objects of the invention will become more apparent and the invention will be better understood from the following detailed description when read in conjunction with the accompanying drawings in which.

DESCRIPTION OF EMBODIMENTS

Figure 1:
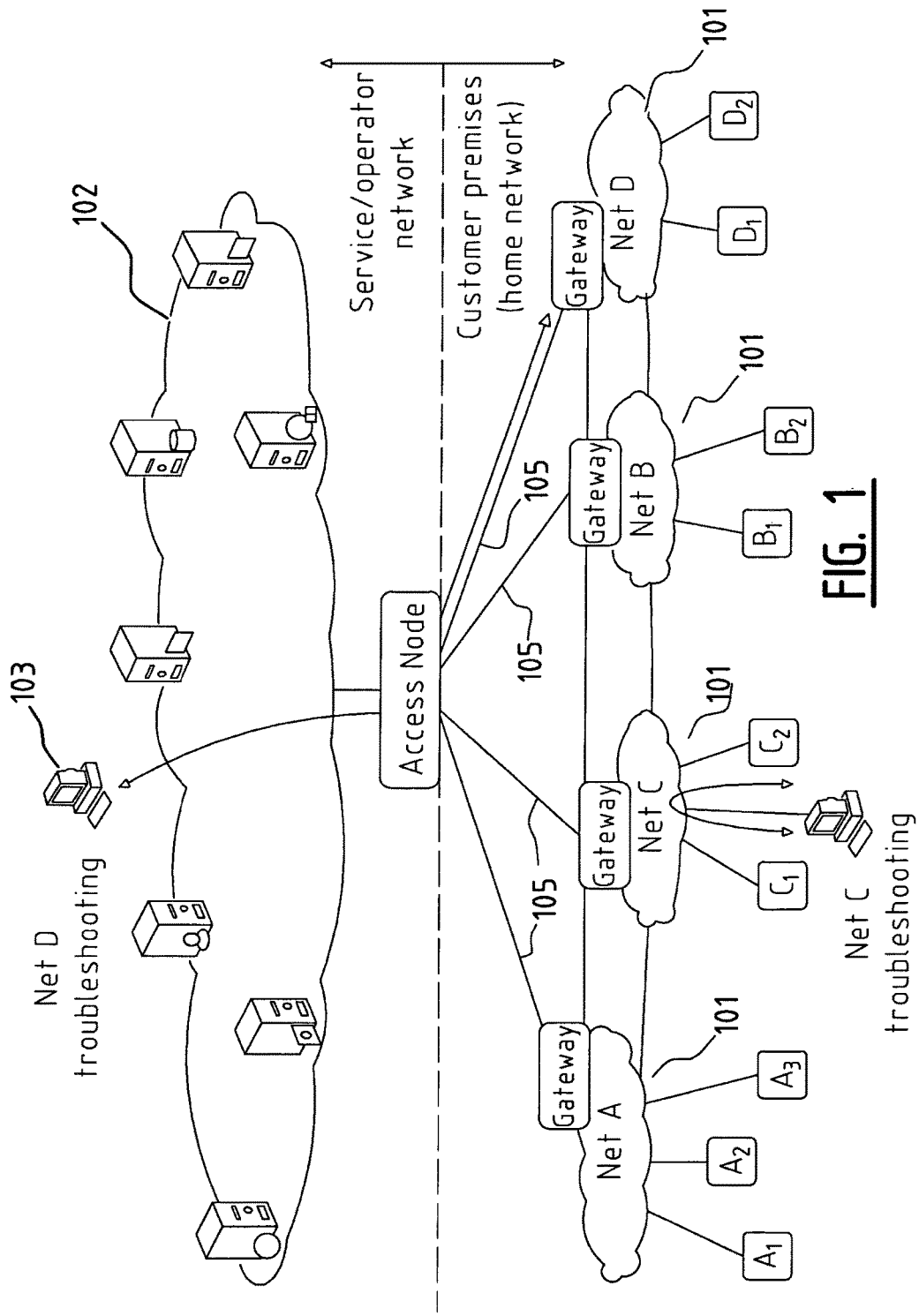
FIG. 1 illustrates troubleshooting in a home network architecture according to the prior art.

FIG. 1 illustrates a home network architecture supported by a service operator network 102 according to the prior art. The home (e.g. G.hn) network consists of at least one or more domains or in-house networks 101 "Net A", "Net B", "Net C" and "Net D" corresponding to different mediums 105 such as wireless, twisted pair, coax and power line cables. FIG. 1 illustrates existing concepts of independent home network troubleshooting either from inside ("Net C troubleshooting", see FIG. 1) where the processing is done e.g. in the service gateway of the in-house network experiencing the problem, or from the outside ("Net D troubleshooting", see FIG. 1) of the home network where the processing is done in a remote server 103.

Figure 2A:
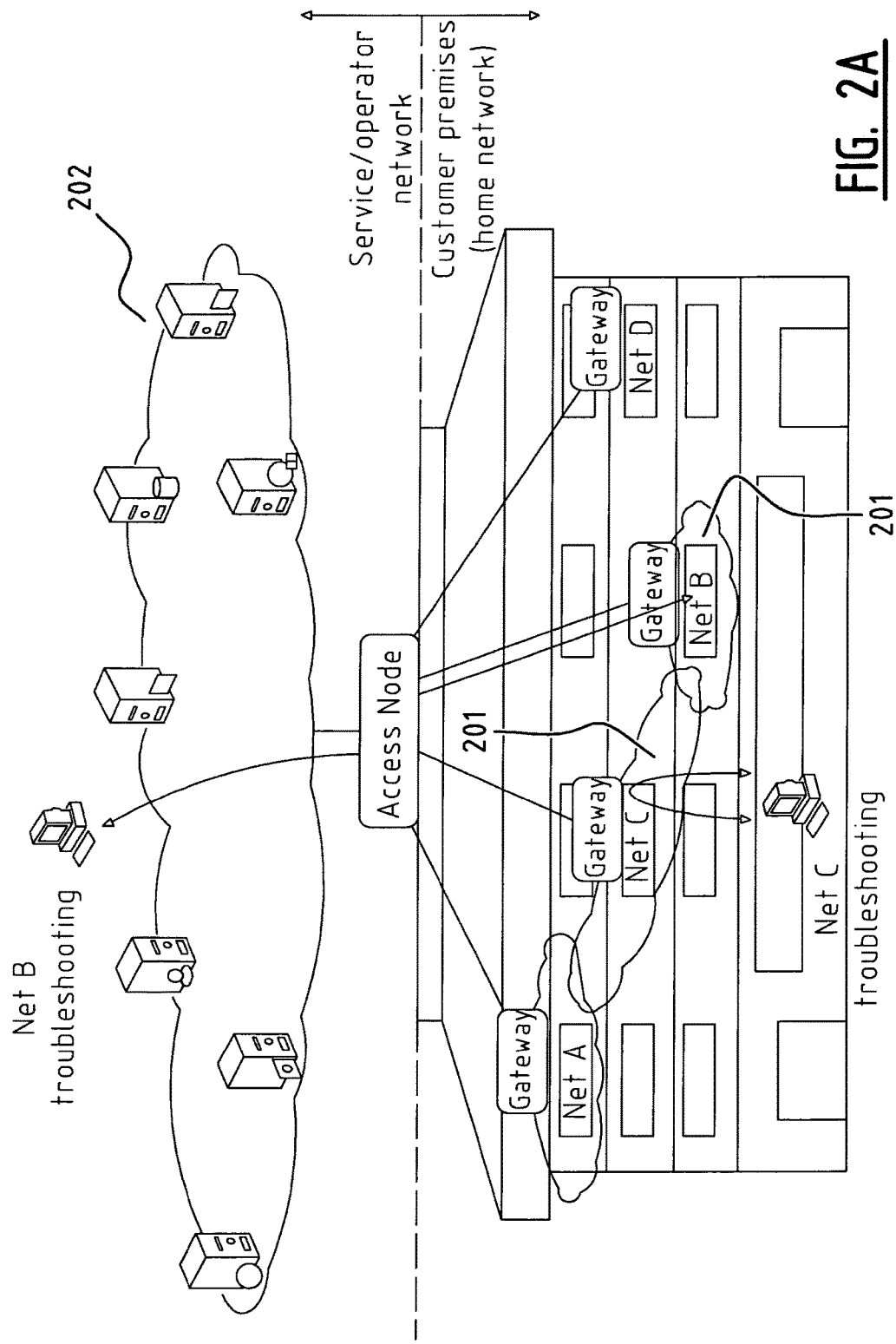
FIGS. 2A and B illustrate a case of an interference problem in a single operator scenario and in a multiple operator scenario.
Figure 2B:
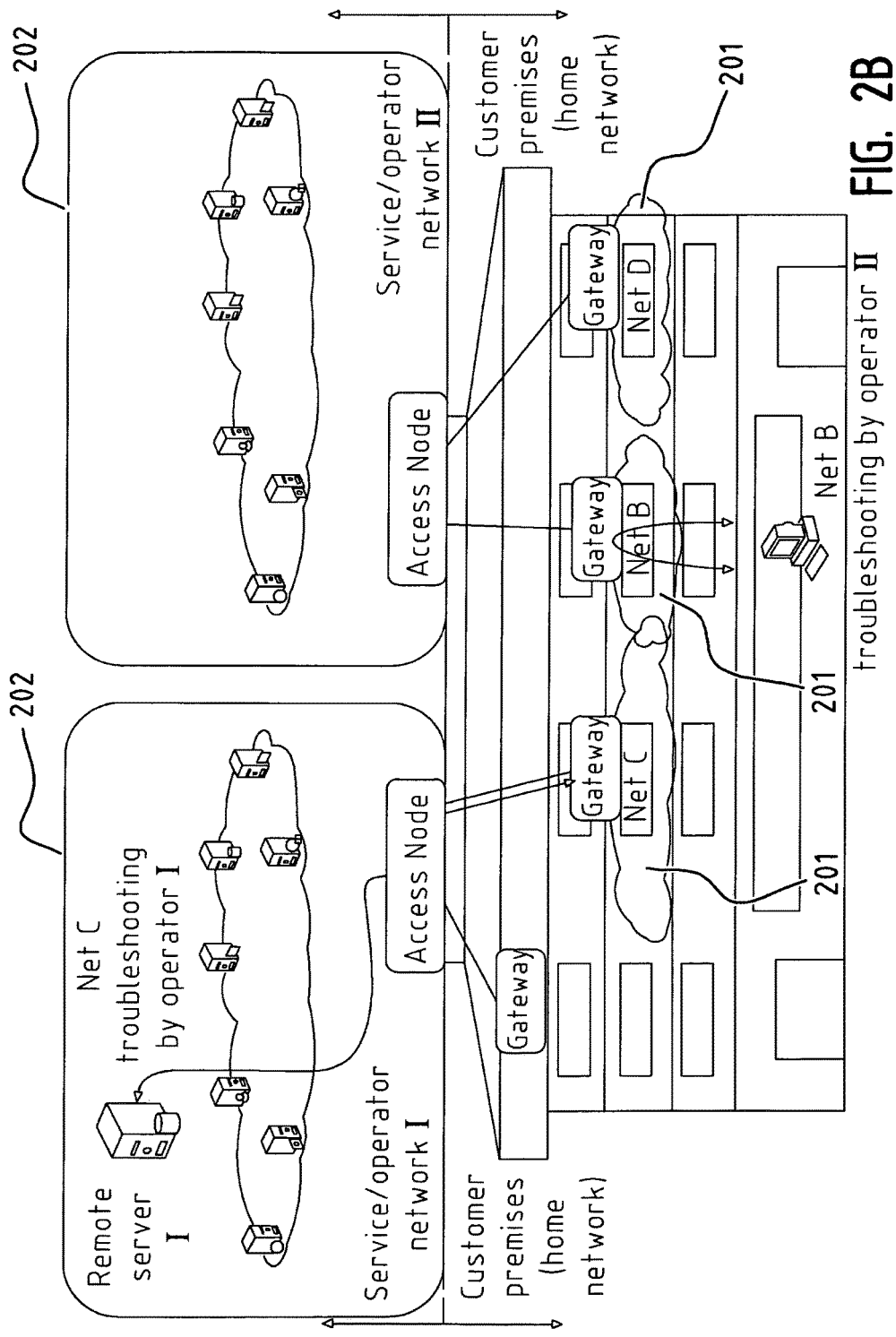

In FIGS. 2A and 2B it is assumed that two in-house networks "Net B" and "Net C" are experiencing interference problems for a single and multiple service operator scenario, respectively. FIG. 2B illustrates an example where a plurality of in-house networks 201 is supported by a plurality of service operators 202. In-house network "Net B" is supported by service operator network I and in-house network "Net C" is supported by service operator network II.

When using the existing troubleshooting methods from the inside or from the outside (see also FIG. 1) the interference problem caused in either the single service provider scenario (FIG. 2A) or in the multi service provider scenario (FIG. 2B) cannot be resolved. This is because both of these concepts are limited only within each 'physical' home network and considered independently. This kind of diagnosis will provide a sub-optimal management since disruptive effects between different in-house networks from single or multiple service operators is not taken into consideration. This can lead to manual network assurance by operator's technicians or the customer himself, user complaints, the need to dispatch technicians to investigate the problems, etc. This procedure is very time consuming and highly costly. Thus, a more proactive dynamic management and coordination of different home networks is an object of embodiments of the invention.

FIGS. 3A-3D illustrate an exemplary embodiment of the invention. In this exemplary embodiment it is assumed that a plurality of in-house networks 301, e.g. "Net A", "Net B", "Net C" and "Net D" are within the same residential dwellings. This plurality of in-house networks 301 is supported by a plurality of service operators 302. Further it is assumed that two in-house networks "Net B" and "Net C" are experiencing problems since the same channel, in the example channel "Ch 11", is used across both in-house networks "Net B" and "Net C". Consequently, the end user quality of experience may be degraded. In-house network "Net B" is supported by service operator network I and in-house network "Net C" is supported by service operator network II.

In the example the operated channel (henceforth channel) is used as an exemplary parameter causing a technical problem. However, the skilled person will understand that other physical or higher layer in-house network parameters such as power, channel gain, MAC address, user ID, IP address, etc., may also be related to a technical problem. Another example of a technical problem involving different in-house networks in a case of power line networks is an overlap of bands between neighboring in-house networks which can deteriorate the data rate. In such a case the power is an important in-house network parameter which may need to be reconfigured for one of the in-house networks involved in the problem. Further, the multi-operator scenario is used as an example, but the skilled person will understand that the invention is also applicable in a single operator scenario.

Figure 3A:
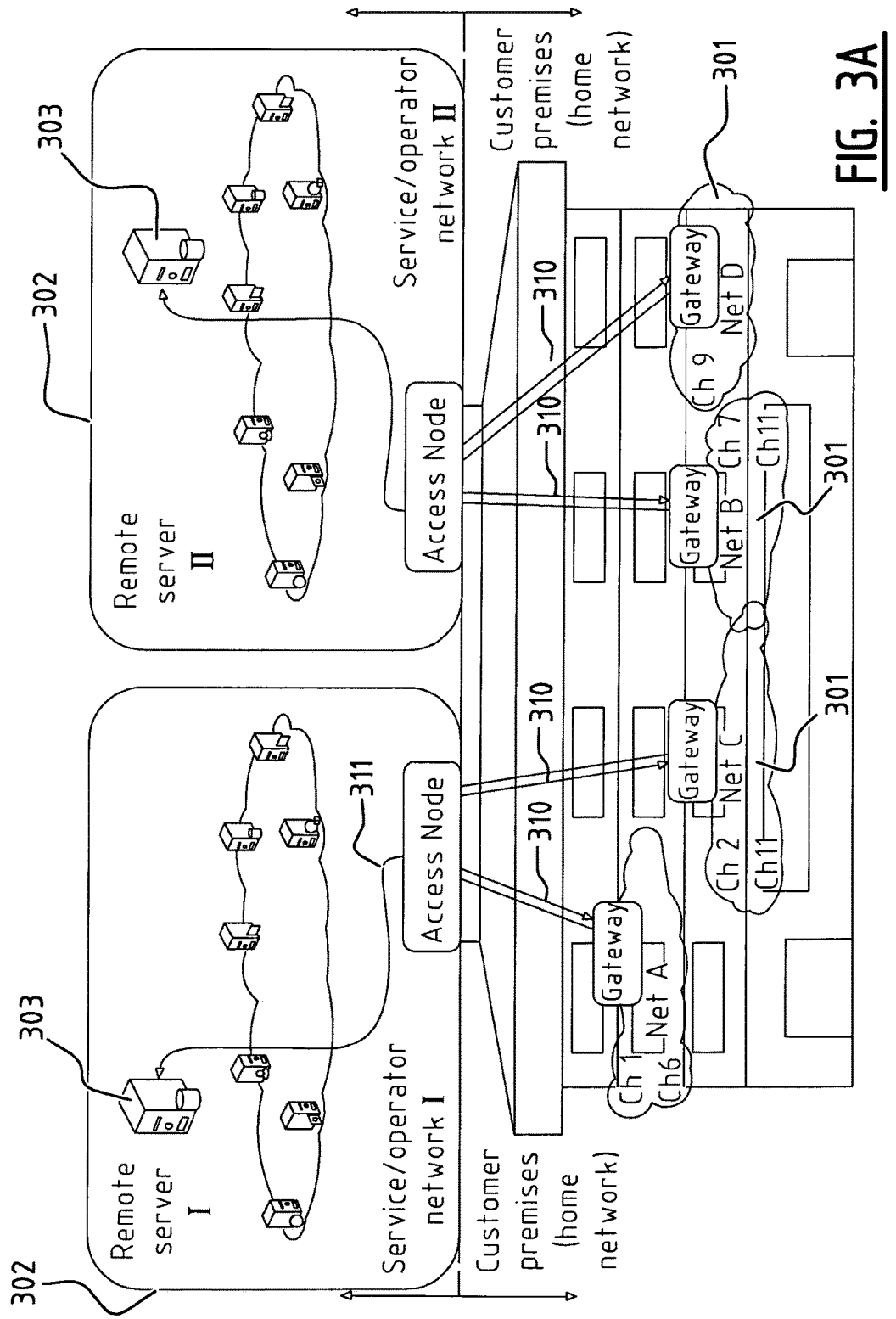
FIGS. 3A-3D illustrate an embodiment of the systems and methods of the invention.

FIG. 3A illustrates a first step where the plurality of service operators 302 obtain in-house network parameters from the plurality of in-house networks 301, see arrows 310, 311. More in particular the management servers or remote servers 303 of service operator networks I and II are able to access in-house network parameters, such as signal power, used and available channels, network SID, device ID, of the in-house networks 301 or to initiate the measurements of those in-house network parameters. Remote server I obtains in-house network parameters for in-house networks "Net A" and "Net B" and Remote server II obtains in-house network parameters for in-house networks "Net C" and "Net D". Optionally, the collected in-house network parameters may be processed at the respective remote server. Depending on whether the respective server is capable to troubleshoot problems within his own network he may decide whether or not to contact the computing means, see further. According to a variant a remote server may immediately contact the computing means when a in-house network supported by this remote server is experiencing a technical problem.

Figure 3B:
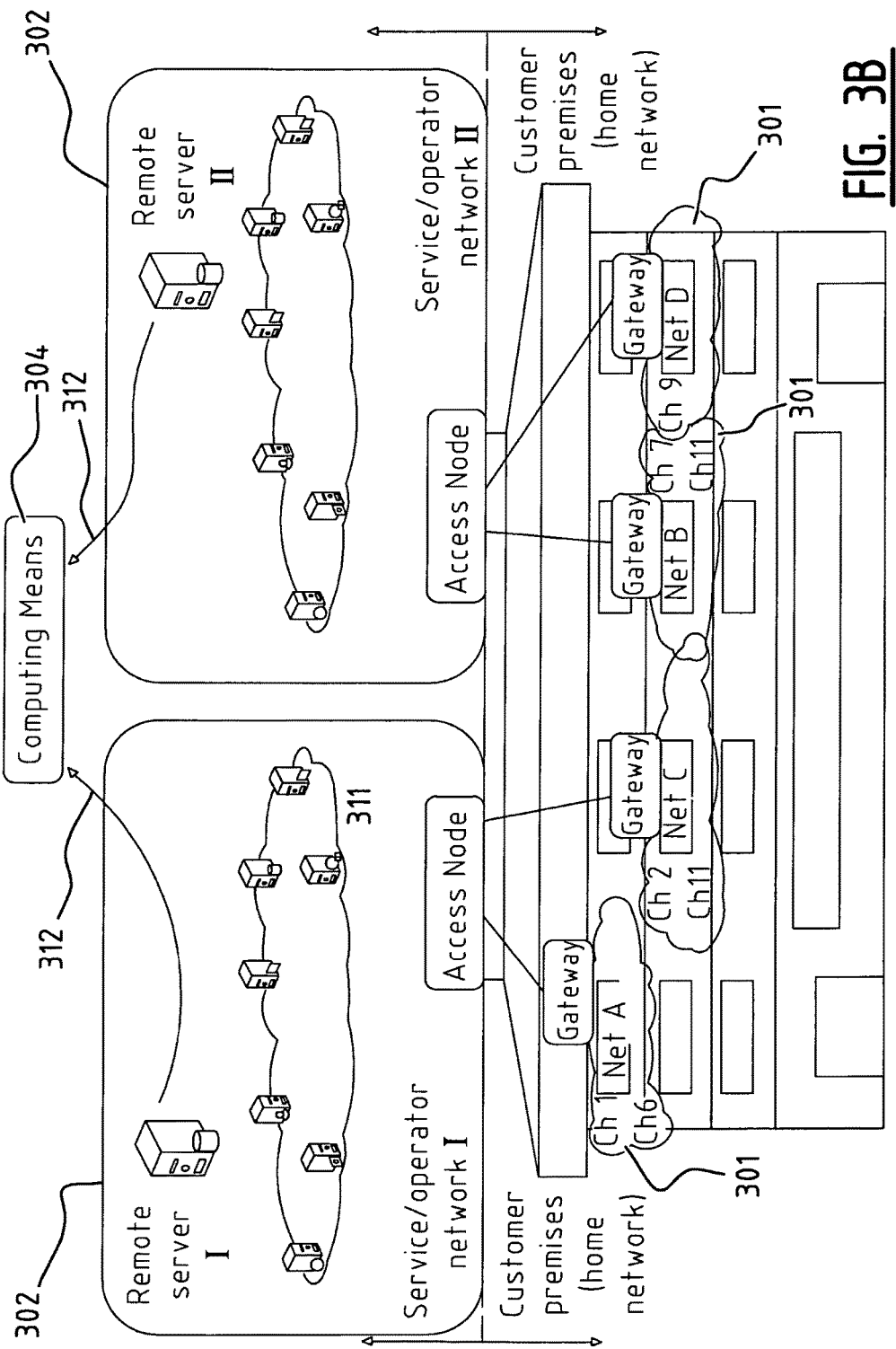

FIG. 3B illustrates a second step of an embodiment of the method of the invention. Each service provider 302 sends the obtained in-house network parameters to a computing means 304, see arrows 312.

Figure 3C:
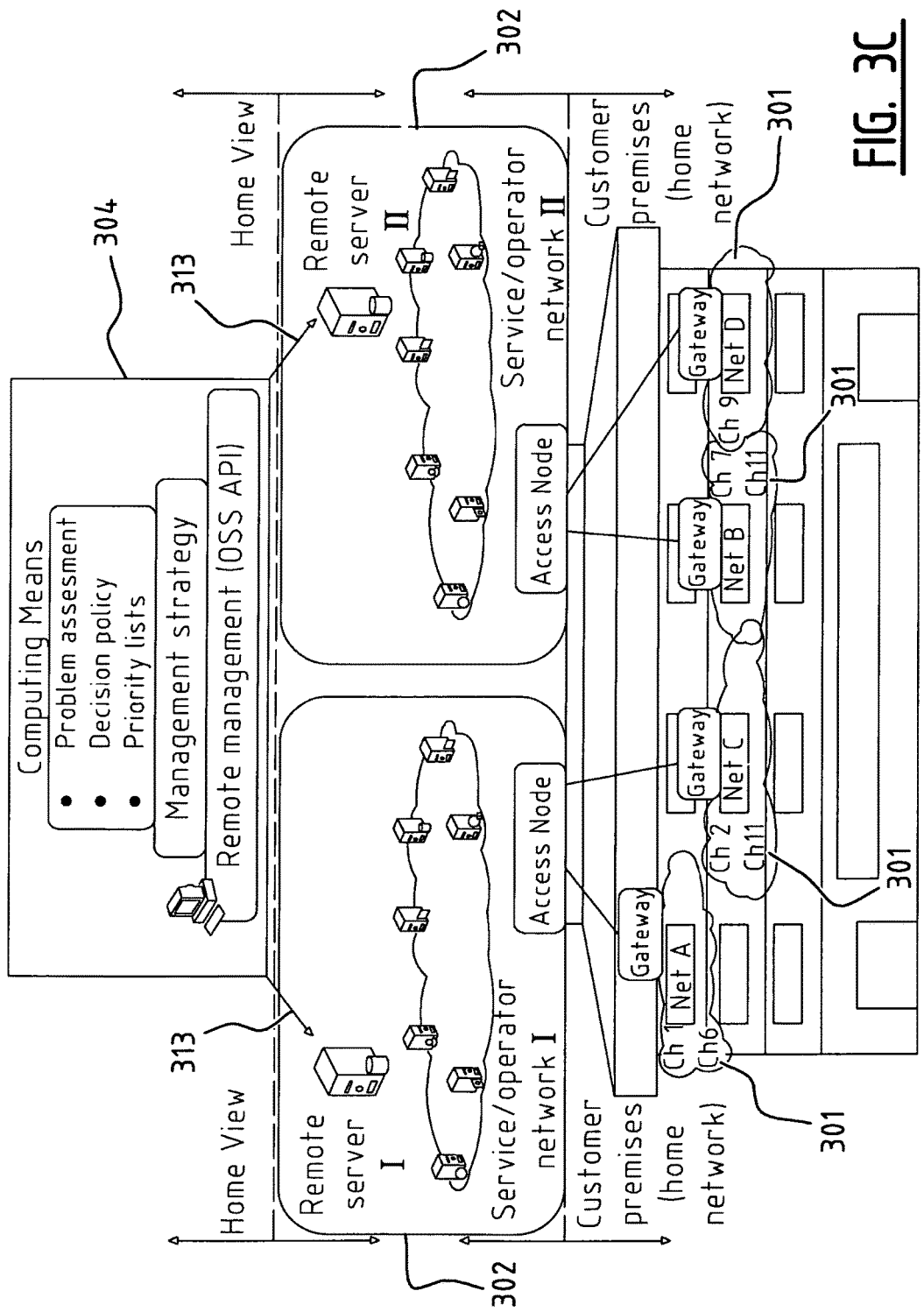
Figure 3D:
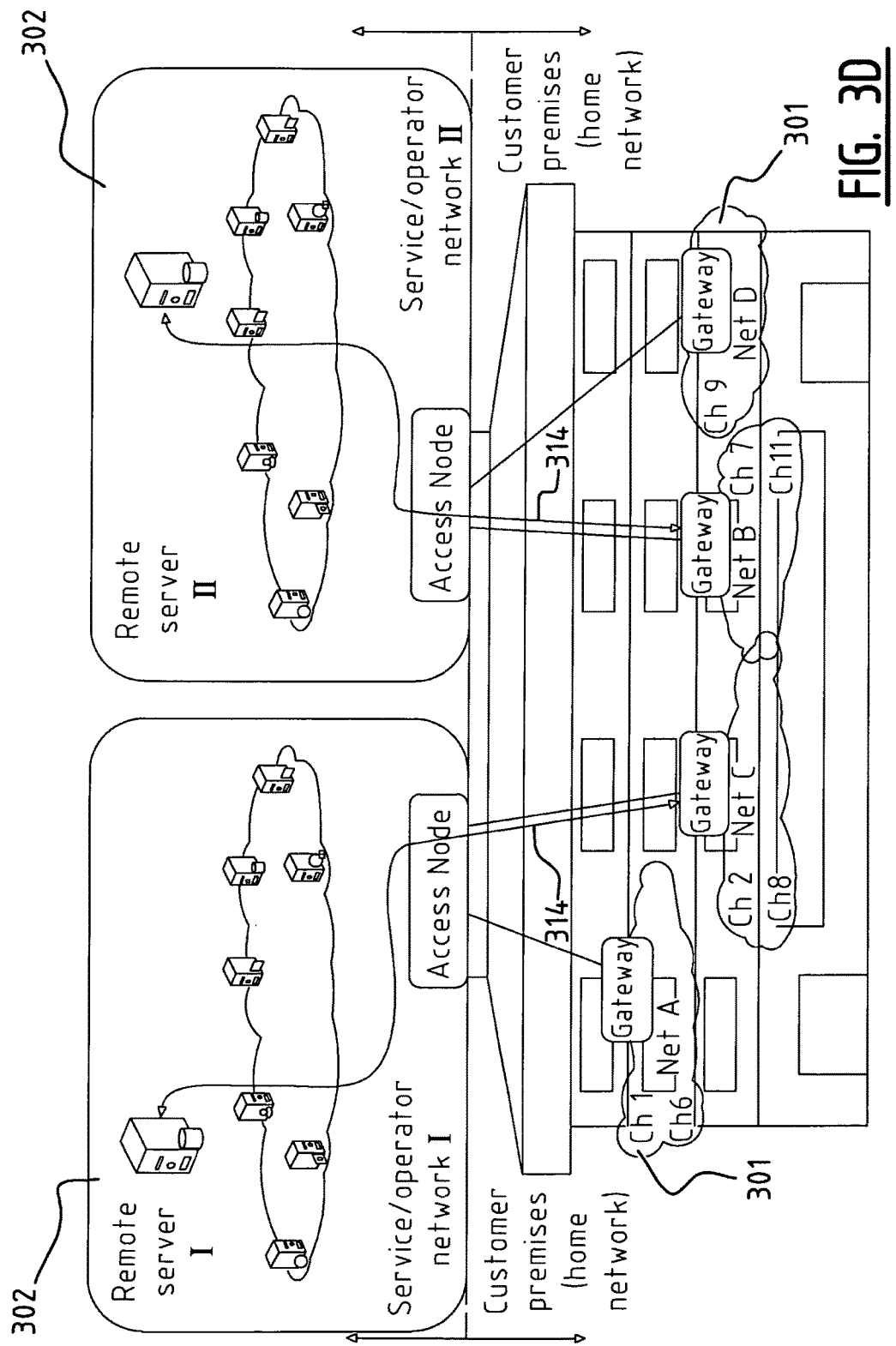

FIG. 3C illustrates a third step of an embodiment of the method of the invention. The computing means 304, e.g. implemented using cloud computing, determine a coordination strategy based on the received network parameters and send instructions corresponding with the determined strategy to the involved one or more service operators, see arrows 313. In other words, the third method step recommends a coordination strategy to service providers in order to overcome the network problems. This coordination strategy typically comprises instructions for the reconfiguration of a number of involved in-house networks of the plurality of in-house networks 301 and a number of involved operators 302 supporting said number of involved in-house networks. In the example of FIG. 3C the coordination strategy will consist of instructions to inform remote server I to change the channel "Ch 11" of in-house network "Net C" into a different channel, e.g. "Ch 8". This coordination strategy is then sent by the computing means 304 to remote server I.

Optionally, the determination by the computing means may be further based on specific service operator requirements, e.g. problem assessment/level, decision policy, priority lists, etc. According to a possible embodiment the determination is done in an abstract layer by using an operation support systems (OSS) application programming interface (API) remote management between different service providers as shown in FIG. 3C.

FIG. 3C illustrates a third step of an embodiment of the method of the invention. The involved one or more service operators 302 reconfigure the one or more involved in-house networks 301 to solve the technical problem, see arrows 314. In the present example remote server I changes the channel "Ch 11" of in-house network "Net C" into a different channel, here "Ch 8". In the present example only remote server I needs to reconfigure one of the in-house networks it supports. However, the skilled person will understand that the coordination strategy may also involve more than one service operator reconfiguring a number of its in-house networks.

Figure 4:
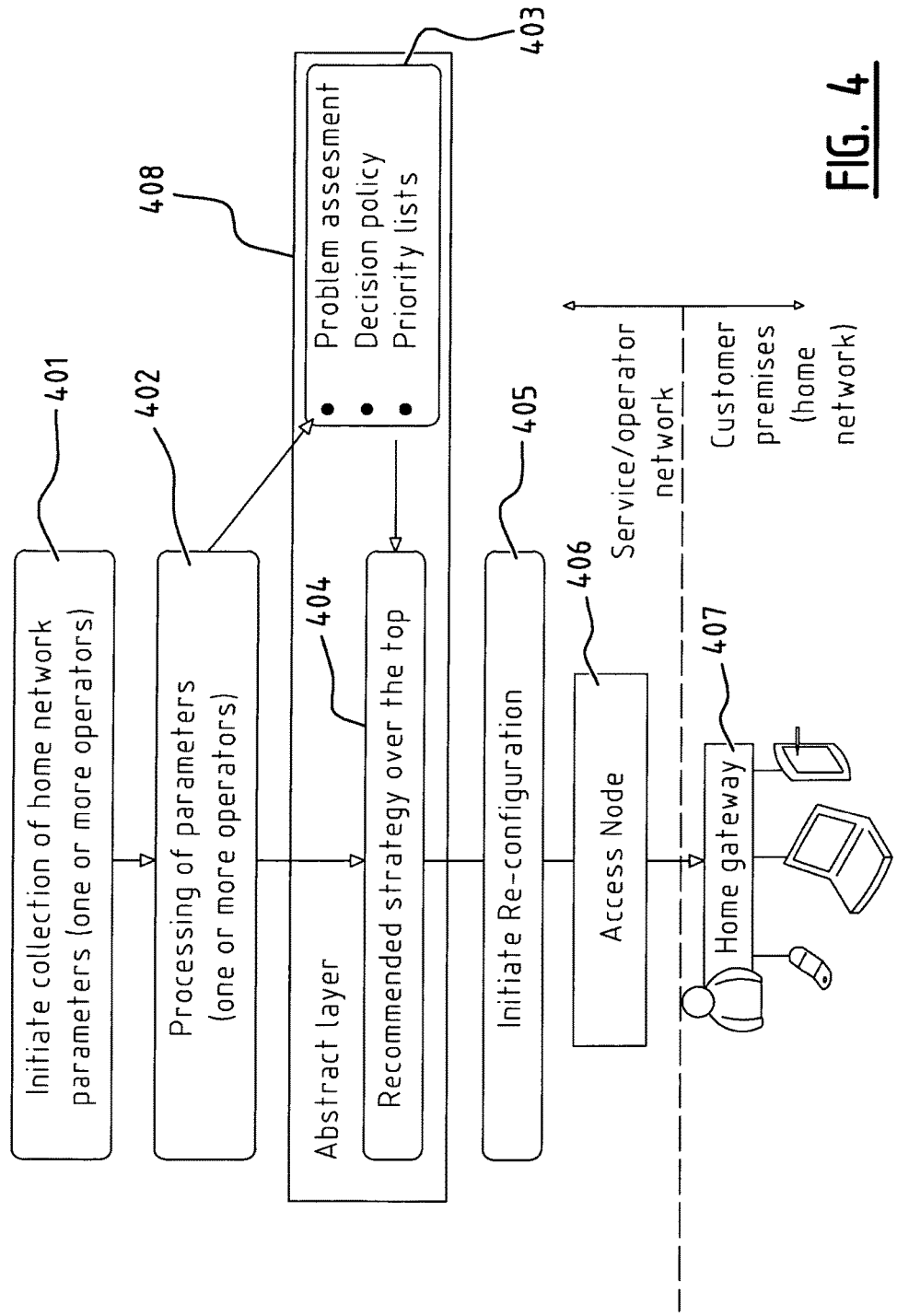
FIG. 4 is a flowchart illustrating a further embodiment of the methods of the invention.

A further embodiment of the method of the invention will now be illustrated with reference to FIG. 4 showing a dynamic management and coordination mechanism's procedure flow. In step 401 one or more service operators collect in-house network parameters of the supported in-house networks. This can e.g. be done using an application layer protocol for remote management of end-user devices such as TR069 or other similar protocols. In an optional step 402 the in-house network parameters collected by a service operator are processed by this service operator. Next, the one or more service operators send the (processed) collected parameters, e.g. imported or input in an excel sheet, to a computing means 408. This can be a centralized or decentralized computing means. This computing means can e.g. be implemented using cloud computing. The computing means are typically adapted to perform an assessment of an incoming problem request and to determine a number of decision policies related to the problem, see 403. Further the computing means may be adapted to give a priority ranking to an incoming problem request, e.g. a HDTV problem may get a higher priority ranking than an email problem. The computing means 408 determine, based on the received network parameters and on the decision policies, a coordination strategy involving the reconfiguration of a number of involved in-house networks of one or more service operators supporting said number of involved in-house networks, see 404. In step 405 the reconfiguration of the involved in-house network(s) is initiated by the involved one or more service operators, and the reconfiguration is performed through the access node 405 and the home gateway 407.

The unique benefit of embodiments of the invention is the fact that dynamic management and coordination of multiple in-house networks within single or multiple service operators is possible. In this way the intervention by the operator's help desk and/or by technicians at the customer residence may be avoided.

Embodiments of the invention take into consideration information from different service operators and provide recommendations to solve problems experienced by in-house network users for each of the operator. This solution may prevent interventions by the operator technician at the customer premises, does not involve any human intervention, may reduce the operators operational costs, and may reduce response time and the number of customer complaints at the help desk. Embodiments of the invention will also increase the global satisfaction of the end-customer with respect to the quality of service, and therefore increase the market penetration of home broadband applications and network technologies.

Whilst the principles of the invention have been set out above in connection with specific embodiments, it is to be understood that this description is merely made by way of example and not as a limitation of the scope of protection which is determined by the appended claims.

The invention claimed is:

1. A system for solving a technical problem in a network architecture with at least one service operator network and a plurality of in-house networks supported by said at least one service operator network, the system comprising:

at least one service operator server associated with said at least one service operator network, and a computing means, each service operator server of said at least one service operator server being configured to obtain in-house network parameters from said plurality of in-house networks and to send said in-house network parameters to said computing means;

said computing means being configured to
receive said in-house network parameters;
determine, based on the received in-house network parameters, that at least two separate in-house networks within a common physical structure and supported by separate service operator servers are using a common channel, the at least two separate in-house networks including separate, respective gateways;
develop, based on the determining, a coordination strategy for the plurality of in-house networks, the coordination strategy involving reconfiguration of the at least two separate in-house networks of said plurality of in-house networks, said reconfiguration including changing a channel of at least one in-house network of the at least two separate in-house networks, such that the at least two separate in-house networks use different channels, respectively; and
inform said separate service operator servers of said coordination strategy;

each separate service operator server being further configured to reconfigure a separate in-house network of the at least two separate in-house networks according to said coordination strategy to solve the technical problem, said reconfiguration including at least one service operator server changing the channel of at least one in-house network of the at least two separate in-house networks according to the coordination strategy.

2. The system of claim 1, wherein the in-house network parameters include at least one of,
signal power in the in-house network,
used channels in the in-house network,
available channels in the in-house network,
a network security identifier (network SID) of the in-house network,
an ID of a device in the in-house network,
a gain of a channel in the in-house network,
a MAC address used in the in-house network,
a user ID used in the in-house network, and
an IP address used in the in-house network.

3. The system of claim 1, wherein each service operator server of said at least one service operator server further includes processing means to perform processing on the obtained in-house network parameters and to send the in-house network parameters to the computing means.

4. The system of claim 3, wherein the processing means are configured to determine whether the technical problem can be solved by the service operator server, and based on a determination that the technical problem cannot be solved by the service operator server, to send the in-house network parameters to the computing means.

5. The system of claim 1, wherein said at least one service operator server includes at least a first service operator server and a second service operator server.

6. The system of claim 1, wherein said computing means include an operation support systems (OSS) application programming interface (API).

7. The system of claim 1, wherein said computing means is further configured to request a service operator server of at least one service provider to send in-house network parameters related to at least one in-house network of said plurality of in-house networks.

8. A method for solving a technical problem in a network architecture with at least one service operator network and a plurality of separate in-house networks supported by said at least one service operator network, the method comprising:
obtaining in-house network parameters from said plurality of separate in-house networks, the plurality of separate in-house networks located within a common structure and supported by separate, respective service operator servers of a plurality of service operator servers, the plurality of separate in-house networks including separate, respective gateways;
sending said in-house network parameters to a computing means;
receiving, from said computing means, a coordination strategy for the plurality of separate in-house networks, the coordination strategy involving reconfiguration of at least two separate in-house networks of said plurality of separate in-house networks based on the sent in-house network parameters, said reconfiguration including changing a channel of at least one in-house network of the at least two separate in-house networks, such that the at least two separate in-house networks are reconfigured from using a common channel to using different channels, respectively; and
reconfiguring at least one in-house network of the at least two separate in-house networks to solve the technical problem, said reconfiguring including changing a channel of the at least one in-house network according to the coordination strategy, such that the at least two separate in-house networks are reconfigured from using a common channel to using different channels.

9. The method of claim 8, wherein the in-house network parameters include at least one of,
signal power in an in-house network of the plurality of separate in-house networks,
used channels in the in-house network,
available channels in the in-house network,
a network security identifier (network SID) of the in-house network,
an ID of a device in the in-house network,
a gain of a channel in the in-house network,
a MAC address used in the in-house network,
a user ID used in the in-house network, and
an IP address used in the in-house network.

10. The method of claim 8, further comprising:
processing the obtained in-house network parameters, such that the in-house network parameters are sent in a processed form to the computing means.

11. The method of claim 10, wherein the processing includes,
determining whether the technical problem can be solved within the service operator network, and
based on a determination that the technical problem cannot be solved within the service operator network, proceeding with the sending of the in-house network parameters to the computing means.

12. The method of claim 8, wherein
said at least one service operator network includes at least a first service operator network and a second service operator network associated with a plurality of first and second in-house networks respectively,
the obtaining in-house network parameters and the sending thereof to the computing means is done by first and second service operator servers associated with the first and the second service operator network;

at least one of the first and the second service operator server is informed by said computing means of a coordination strategy involving at least one of a number of said plurality of first in-house networks and a number of said plurality of second in-house networks; and the reconfiguring includes at least one of (i) the first service operator server reconfiguring a number of said plurality of first in-house networks and (ii) the second service operator server reconfiguring a number of said plurality of second in-house networks.

13. A method for solving a technical problem in a network architecture with at least one service operator network and a plurality of separate in-house networks supported by said at least one service operator network, the method comprising:

receiving, from said at least one service operator network, in-house network parameters obtained from said plurality of separate in-house networks, said plurality of separate in-house networks included in a common structure and supported by a separate, respective service operator servers of a plurality of service operator servers, the plurality of separate in-house networks including separate, respective gateways;

determining, based on the received in-house network parameters, that at least two separate in-house networks of the plurality of separate in-house networks are using a common channel;

developing, based on the determining, a coordination strategy for the plurality of separate in-house networks, the coordination strategy involving reconfiguration of the at least two separate in-house networks of said plurality of separate in-house networks, said reconfiguration including changing a channel of at least one in-house network of the at least two separate in-house networks, such that the at least two separate in-house networks use different channels, respectively; and informing said separate, respective service operator servers of the plurality of service operator servers of said coordination strategy, such that the technical problem is solved, said solving including reconfiguring at least one in-house network of the at least two separate in-house networks according to said coordination strategy to solve the technical problem, said reconfiguring including changing a channel of the at least one in-house network of the at least two separate in-house networks according to the coordination strategy.

14. The method of claim 13, further comprising:

requesting a service operator network of at least one service provider to send in-house network parameters related to one or more in-house networks of the plurality of separate in-house networks.

15. A non-transitory computer readable storage medium storing a program of instructions, the program of instructions being executable by a computing means to cause the computing means to perform the method of claim 13.

* * * * *